United States Patent [19]

Shepherd et al.

[11] Patent Number: 5,738,803

[45] Date of Patent: *Apr. 14, 1998

[54] POLARIZER FILMS COMPRISING WHOLLY AROMATIC LIQUID CRYSTALLINE POLYMERS AND DICHROIC DYES

[75] Inventors: James P. Shepherd, Springfield; Sunny S. Shen, Holmdel; Brian B. Marr, Annandale; Larry F. Charbonneau, Mendham, all of N.J.

[73] Assignee: Hoechst Celanese Corp, Somerville, N.J.

[*] Notice: The term of this patent shall not extend beyond the expiration date of Pat. No. 5,672,296.

[21] Appl. No.: 572,461

[22] Filed: Dec. 14, 1995

[51] Int. Cl.[6] .............................. C09K 19/00; F21V 9/14
[52] U.S. Cl. .................... 252/299.1; 252/299.01; 252/585
[58] Field of Search .......................... 252/299.01, 299.1, 252/585, 582

[56] References Cited

U.S. PATENT DOCUMENTS 4,840,640  6/1989  Miura et al. .
5,059,356  10/1991  Nakamura et al. .

FOREIGN PATENT DOCUMENTS 0 275 077 A1  7/1988  European Pat. Off. .......... C09B 1/58
63-195602  8/1988  Japan .
WO 96/38743  12/1996  WIPO .............................. G02B 1/08

OTHER PUBLICATIONS

Patent Abstracts of Japan, vol. 012, No. 477 (P–800), 14 Dec. 1988 & JP 63 195602 A (Mitsubishi Kasei Corp), 12 Aug. 1988.

Patent Abstracts of Japan, vol. 010, No. 080 (P–441), 29 Mar. 1986 & JP 60 218602 A (Mitsui Toatsu Kagaku KK), 1 Nov. 1985.

Database WPI, Section Ch, Week 8741, Derwent Publications Ltd., London, GB; Class A23, AN 87–289507, XP002032175 & JP 62 204 202 A (Mitsubishi Chem Ind Ltd), 8 Sep. 1987.

*Primary Examiner*—Philip Tucker
*Attorney, Agent, or Firm*—P. S. Kalyanaraman

[57] ABSTRACT

This invention provides novel liquid crystalline polymers which, when mixed with a suitable dye and extruded, yields polarizer films with superior polarizing efficiency, transmittance, dichroic ratio, and thermal and humidity stability. The invention further provides a process to prepare such polymers and polarizer films therefrom.

18 Claims, No Drawings

POLARIZER FILMS COMPRISING WHOLLY AROMATIC LIQUID CRYSTALLINE POLYMERS AND DICHROIC DYES

FIELD OF THE INVENTION

This invention relates to polarizer films prepared from blends of novel liquid crystalline polymers and dichroic dyes. The subject matter herein is related to that disclosed in patent applications, Ser. No. 08/460,288, filed Jun. 2, 1995, now U.S. Pat. No. 5,672,296 and Ser. No. 08/459,907, filed Jun. 2, 1995 abandoned.

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. Typically, Polarizers are used in the form of film, the polarizer film (also called polarizing film). In an LCD, the liquid crystal elements are generally sandwiched between two layers of polarizing films which regulate the incident light that enters the liquid crystal producing an on-and-off contrast.

The polarizing film traditionally comprises a stretched polymer film such as, for example, polyvinyl alcohol (PVA), a colorant and other optional layers. The colorant is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polarizing film influences the performance of the polarizer as well as the device wherein the polarizing film is used. Traditional polarizing films such as stretched PVA are increasingly found to be inadequate in performance. Their limitations have become apparent with increasingly sophisticated applications for Polarizers and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Accordingly, improved polarizing films are urgently required to satisfy increasingly sophisticated applications.

Several attempts have been made to improve the quality and performance of polarizer films with limited success. U.S. Pat. Nos. 5,310,509 and 5,340,504 disclose polarizing films based on water-soluble organic polymers such as polyvinyl alcohol and dichroic dyes. U.S. Pat. Nos. 4,824,882 and 5,059,356 disclose polyethylene terephthalate ("PET") films for polarizer applications. U.S. Pat. No. 5,318,856 discloses films of polyvinyl alcohol, polyvinyl formal, polyvinyl acetal and polyvinyl butyral. U.S. Pat. No. 4,842,781 discloses films of polyvinyls, polyester and polyamides. These polymers, however, still have the same disadvantages of PVA, especially in thermal and humidity resistance.

U.S. Pat. No. 5,071,906 discloses a polarizing film comprising a uniaxially stretched PVA having a degree of polymerization of about 2,500–10,000, and a colorant. While this is a slight improvement over traditional lower molecular weight PVA, it still suffers from the disadvantages of PVA. Furthermore, the film will still have to be stretched to achieve orientation.

It is known that liquid crystal polymers do not need to be stretch oriented. The process of molding or extrusion generally achieves high degree of orientation in such polymers. For this reason, liquid crystal polymers would be ideal candidates for polarizer substrate film applications. For example, Japanese patent application JP 62-28698 (filed Feb. 10, 1987) discloses a polarizing film consisting of a thermotropic liquid crystal polyester film with a dichroic coloring matter dyed and oriented, wherein the polymer is a copolyester of a hydroquinone derivative (A), a terephthalic acid ingredient (B), an isophthalic acid ingredient (C) and a parahydroxybenzoic acid ingredient, with the molar ratio of A to D being in the range 5:95 to 70:30% and the molar ratio of B to C being in the range 50:50 to 100:0%. The disclosed polymer compositions are difficult or nearly impossible to make. Additionally, the monomer ratios disclosed for those polymers do not necessarily yield a balanced formula for preparing liquid crystalline polymer compositions. Moreover, if even one could make such polymers, any films from such polymers are likely to be substantially deficient in optical transparency, orientation and heat/moisture resistance, which therefore would limit and/or prevent any potential utility as polarizing films, especially in stringent environments.

U.S. Pat. No. 4,840,640 discloses the use of "liquid crystalline polyethylene terephthalate-parahydroxybenzoic acid," formed by copolymerizing a polyethylene terephthalate component (A) with a parahydroxybenzoic acid component (B) with the A:B molar ratio being in the range 40:60 to 5:95. Optical properties are a concern with such compositions. Such compositions have to be first blended with a dichroic acid and then formed into a film through a die at a high shear rate to achieve satisfactory film orientation and transparency. Insufficient transmittance of the light at the wavelength employed would preclude use of films from such polymers for polarizer applications. Perhaps because of such limitations of these "improvements," films based on PVA are still the only ones commercially available for polarizer uses, despite their own disadvantages mentioned earlier.

Pending U.S. patent applications, Ser. No. 8/460,288, filed Jun. 02, 1995, and Ser. No. 8/459,907, filed Jun. 02, 1995 disclose novel liquid crystalline polymer compositions useful in polarizer applications. The compositions disclosed therein are liquid crystalline polyesters which comprise repeat units corresponding to the formula:

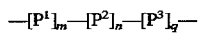

$$-[P^1]_m-[P^2]_n-[P^3]_q-$$

wherein $P^1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 0–70 mole percent individually, with m+n+q totaling 100 mole percent. Additional monomers could also be present. A preferred composition is a film-forming wholly aromatic thermotropic liquid crystal polyester which comprises 4-hydroxybenzoic acid, terephthalic acid, 4,4'-dihydroxybiphenyl, 6-hydroxy-2-naphthoic acid, and resorcinol in a molar ratio 30:20:10:30:10 respectively. While this was an improvement over the earlier polarizer materials, sophisticated applications require a range of materials that are suitable to be processed under a range of processing conditions.

Accordingly, it is an object of this invention to provide a substantially improved polarizing film useful for existing as well as sophisticated applications.

It is another object of this invention to provide a liquid crystal polymeric film with high thermal stability and utility for polarizer applications.

It is an additional object of this invention to provide liquid crystal polymer compositions that can be blended with suitable dyes and then formed into films useful for polarizer applications.

It is yet another object of this invention to provide liquid crystalline polymers which can form films with high orientation, optical transparency, moisture resistance and heat resistance.

It is a further objective of this invention to provide liquid crystalline polymers which can be dyed and suitably processed to provide polarizing films with high orientation, dichroic ratio and polarizing efficiency.

SUMMARY OF THE INVENTION

One or more of the objects of the present invention are accomplished by the provision of a polarizing film which possesses a polarizing efficiency of at least 70%, and comprises a blend of (a) a film-forming, wholly aromatic thermotropic liquid crystalline polymer ("LCP"), and (b) a suitable dichroic dye. The LCP may be a polyester, polyamide, polyesteramide, polyketone, polycarbonate, polyurethane, polyether and the like. A preferred LCP is a polyester or a polyesteramide. An inventive liquid crystalline polymer comprises repeat units corresponding to the formula:

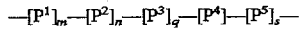

wherein $P^1$ is an aromatic hydroxy monocarboxylic acid or an aromatic amino carboxylic acid; $P^2$ is an aromatic dicarboxylic acid; $P^3$ is a diphenolic compound; $P^4$ is a second aromatic amino carboxylic acid moiety or an aromatic hydroxy carboxylic acid moiety which is different from $P^1$; $P^5$ is a second diphenol moiety different from $P^3$; m, n, q, r and s represent mole percent of the respective monomers, with m+n+q+r+s totaling 100 mole percent. The quantities m, n, and q may generally range from 5–70% individually, while r and s are in the range 5–20 mole %, the preferred range of m is about 5–40%, n is about 5–40% and q is about 5–30%. Other suitable monomers may also be part of the polymer repeat unit, in which case the total is adjusted to be 100 mole %. By suitable choice of monomers for $P^1$, $P^2$, $P^3$, $P^4$ and $P^5$ and for any other additional moieties, as well as their mole percents, the invention provides LCPs with the above-mentioned substantially improved polarizer characteristics and thermal stability.

The invention further provides a process to make such compositions. The invention further discloses polarizer films made with such improved compositions.

DESCRIPTION OF THE PREFERRED EMBODIMENTS

In one embodiment, the present invention discloses polarizing films with high orientation, optical clarity, dichroic ratio, polarizing efficiency, and improved humidity/heat resistance. The term "high orientation" refers to orientation of at least 90%. The term "high optical clarity" refers to amorphousness and is measured by light transmission of at least 30% in the wavelength range 350–750 nm. The term "high dichroic ratio" refers to ratio of at least 8 and "high polarizing efficiency" refers to polarization efficiency of at least 70%. The term "improved humidity/heat resistance" refers to no substantial change in the optical properties of the film when the film is exposed to environmental conditions of at least about 90% humidity and temperatures of at least about 90° C. for at least about 100 hours.

The inventive polarizing films are obtained from blends of inventive LCP compositions and suitable dichroic dyes. The inventive LCP compositions are film-forming, wholly aromatic thermotropic liquid crystalline polymers which may be liquid crystalline polyesters, polyamides, polyesteramides, polyketones, polycarbonates, polyurethanes, polyethers and the like. Preferred LCP is a film-forming, wholly aromatic thermotropic liquid crystalline polyester or a polyesteramide. A typical preferred polymer is characterized by the repeat units:

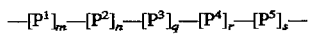

wherein $P^1$, $P^2$, $P^3$, $P^4$ and $P^5$ are as described above. Examples of $P^1$ include, but are not limited to, monomers such as, for example, 4-hydroxybenzoic acid, 2-hydroxy-6-naphthoic acid, 4-aminobenzoic acid and 4-carboxy-4'hydroxy-1,1'-biphenyl. Examples of $P^2$ include, but are not limited to, monomers such as, for example, terephthalic acid, isophthalic acid, phthalic acid, 2-phenylterephthalic acid, 1,2-naphthalene dicarboxylic acid, 1,4-naphthalene dicarboxylic acid, 2,6-naphthalene dicarboxylic acid and 4,4'-biphenyl dicarboxylic acid. Examples of $P^3$ include, but are not limited to, hydroquinone, methyl hydroquinone, phenyl hydroquinone, catechol, 4,4'-dihydroxy biphenyl, and acetaminophen. Examples of $p^4$, which is different from $P^1$, include, but are not limited to, 4-hydroxybenzoic acid, 2-hydroxy-6-naphthoic acid, 4-aminobenzoic acid and 4-carboxy-4'hydroxy-1,1'-biphenyl. Examples of $P^5$, which is different from $P^3$, include, but are not limited to, hydroquinone, methyl hydroquinone, phenyl hydroquinone, catechol, 4,4'-dihydroxy biphenyl, resorcinol and acetaminophen. In selecting monomers and their quantities, care should be taken not to sacrifice the desired properties of the polymer. Suitable choice of monomers and their respective amounts leads to the inventive polymers with desired optical and thermal properties.

The invention may be illustrated by the liquid crystalline polyester, prepared from the monomers 4-hydroxybenzoic acid ("HBA") for $P^1$, terephthalic acid ("TA") for $P^2$, 4,4'-biphenol ("BP") for $P^3$, 6-hydroxy-2-naphthoic acid ("HNA") for $P^4$, and phenylhydroquinone ("PhHQ") for $P^5$, in its repeat unit in the ratio 0:20:10:30:10 respectively. Preparation of the LCP composition may be done by any known method. In a typical synthesis, the above-noted five monomers in their respective mole ratios are mixed in a suitable apparatus containing a suitable distillation head. The flask is immersed in an oil bath and purged of oxygen by evacuation followed by flushing with dried nitrogen. The contents are kept in an inert atmosphere while a catalyst such as, for example, potassium acetate, and a solvent such as, for example, acetic anhydride are added to the ingredients and the mixture is heated and stirred in an oil bath. The temperature is raised high enough for acetic acid to distill over. After almost all acetic acid has been possibly removed, the apparatus is evacuated when the desired polymer forms as a polymer melt. As any remaining acetic acid distills over, the viscosity keeps increasing. The apparatus is then cooled to, for example, ambient temperature, when the desired polymer is isolated.

The polymer may be analytically characterized by measuring polymer properties such as inherent viscosity ("I.V."), melt viscosity ("MV"), as well as by other techniques such as differential scanning calorimetry ("DSC"), thermogravimetric analysis ("TGA"), NMR, and the like conventional methods well known to those skilled in the art. I.V. may be defined as:

$$I.V.=ln(\eta_{rel})/c$$

where c is the concentration of solution (0.1 wt %), and $\eta_{rel}$=relative viscosity. The relative viscosity may be measured by dividing the flow time in a capillary viscometer of the polymer solution by the flow time of the pure solvent. DSC gives a good indication of the glass transition temperature ($T_g$) while hot stage optical microscopy measures the liquid crystalline phase change and the anisotropy of the melt. The polymer had an inherent viscosity (IV) of 5.7 dl/gm as determined in a 0.1% (by weight) solution in 1:1 Pentafluorophenol-hexafluoroisopropanol at 60° C. The polymer had a glass transition temperature (Tg) of 136° C. and no solid-to-nematic transition as determined by differential scanning calorimetry (10° C./min heating rate). The polymer melt was optically anisotropic, and at 290° C., could be extruded into a transparent film with good strength.

By varying the chemical nature of the monomers $P^1$, $p^2$, $P^3$, $P^4$ and $p^5$, and their amounts in the polymerizations, several LCPs could be prepared, as described in the EXAMPLES section below, as well as in Table 1.

An embodiment of the present invention includes polarizing films made with the inventive liquid crystalline polymers. The polymer may be blended with colorants such as iodine, or preferably organic dichroic dyes, to produce a composition to form polarizing film therefrom. Suitable dichroic dyes include, but are not limited to, straight chain dyes, branched dyes, direct dyes, disperse dyes, acidic dyes and the like. Yellow, orange, blue, purple or red dyes are all suitable. Several classes of suitable dyes are well known to those skilled in the art. They include, but are not limited to azo dyes, anthraquinone dyes, commercially available Disperse dyes such as Blue 214, Red 60 and Yellow 56, direct dyes such as Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen (available from Aldrich Chemical Company, Milwaukee, Wis.). More than one compatible dyes may also be used, if so desired, as well as a combination of iodine and one or more dichroic dyes. The choice of suitable dichroic dye or dyes depends on several factors, as is well known to those skilled in the art. Some such factors include, but are not limited to, light fastness and migration in the polymer. Another desirable property is that the transition moment of the dye and molecule main axes should have the same direction.

If iodine is to be used as the sole colorant, a conventional method to incorporate iodine to form a polarizer is to first form a film of the LCP by a suitable method (such as, for example, extrusion, die casting, spin coating, and the like), and then immerse the film into a solution of iodine in a suitable solvent in suitable concentration. A preferred method is to use an aqueous solution of a mixture of iodine and potassium iodide. This solution may further contain a suitable crosslinking agent such as boric acid, borax or glutaraldehyde, as is well known to those skilled in the art.

The present invention, however, prefers a dichroic dye as the colorant instead of iodine. When a dichroic dye is used as the colorant, a similar procedure (to iodine incorporation) may be followed, wherein a film of the polymer is formed by a suitable process and then dipped into a solution of the dye in a suitable solvent in a suitable concentration. A preferred method, however, is to physically blend the polymer and the dye at a suitable temperature, e.g., ambient temperature, and then form the film from the blend by a suitable method. A more preferred method, however, is to melt-blend a mixture of both the liquid crystalline polymer and the colorant (blending the two together at temperatures above ambient, preferably at or near the melting temperature of the polymer), prior to film formation, into an extrudable mixture and then extrude the mixture at a suitable temperature into a film. This method yields a uniformly dispersed dye in the polymer film. This preferred method is made possible by the uniqueness of the inventive LCPs which have good and stable thermal characteristics that make them ideally suitable for melt processing operations. Thus, for example, the above-described inventive liquid crystalline polyester and a suitable dye may be taken together in a suitable mixer and heated to a suitable temperature, for example at around 200° C. and blended to form a well blended mixture. This mixture may be charged into a suitable melt extrusion apparatus, melted and the melt then extruded to a suitable dimension polarizer film. This process has the added advantage that film dimensions can be easily changed by changing the extrusion die accordingly. The choice of a suitable dye or dyes has relevance in this process of melt blending and extrusion. Since melt blending and extrusion are at fairly high temperatures, the dye and the polymer have to possess adequate thermal stability at such temperatures. The inventive polymers fit that requirement very well. The process also takes advantage of the high orientation achievable from such liquid crystalline polymers.

Characterization of the inventive polarizer film may be performed by well known methods skilled in the art. Polarizer films prepared according to the present invention have high orientation, high thermal and humidity resistance and also possess excellent optical characteristics such as light transmittance and polarizing coefficient in the wavelength desired. The desired wavelength generally depends on the colorant selected.

In a typical experiment, for example, an inventive polymer prepared as described above was melt-blended with Methylene Violet Bernthsen dye at about 240° C. and the blend was then melt extruded at temperatures above 200° C. to form a polarizer film. Optical properties of this film including polarizing efficiency were measured according the procedure described in U. S. Pat. No. 5,071,906 cited above. The film had a blue color with transmittance of about 40% and a polarizing efficiency of about 93% in the wavelength region 550–630 nm. Even after subjecting this film to an environment of 100° C. and 95% Relative Humidity ("R.H.") for about 120 hours, the polarizing efficiency stayed at about 92%, with virtually no change. For comparison, two commercially available polarizer films, one based on PVA and iodine and the other based on PVA and a dichroic dye, were tested under the same conditions. The polarizing efficiencies of these comparative films dropped off either totally or substantially after exposure to the above-noted heat/humidity environment, demonstrating the superior optical properties and thermal/humidity resistance of the inventive polarizer films over conventional polarizer films.

In addition to offering Polarizers with superior properties, the present invention allows one to tailor-make polarizer films to suit different wavelengths. This is done by appropriately selecting the dye or dyes. The preferred process is a melt extrusion; no solvents are generally needed. Because of this advantage, the dye incorporation and distribution are likely to be much more uniform than in a solution-dipping process. Furthermore, the extrusion temperatures can be easily adjusted to suit different colorants and LCP compositions. Thus the inventive process is much more versatile than the conventional methods of preparing polarizer films. Additionally, the present invention advantageously offers superior liquid crystal display devices based on and incorporating the inventive polarizer films.

The following EXAMPLES are provided to further illustrate the present invention, but the invention is not to be construed as being limited thereto.

acid (V), 4,4'-dihydroxybenzophenone (DHB), 2,7-dihydroxynaphthalene (2,7-DHN), 1,4-dihydroxynaphthalene (1,4-DHN), 1,6-dihydroxynaphthalene (1,6-DHN) and 3,3'-diphenyl-4,4'-biphenol (DPBP), 2,6-dihydroxyanthraquinone (AQ), and 1,4-cyclohexanedimethanol (CHDM). Resorcinol was used in Examples 5, 9, 10, and 13. The composition and physical properties of these compositions appear in Table 1 (X is monomer $P^5$).

TABLE 1

| Example | Monomer (X) | Molar Composition, % | | | | | | Tg, °C. | Tm, °C. | Film |
|---|---|---|---|---|---|---|---|---|---|---|
| | | HBA | HNA | TA | BP | R | S | | | |
| 1 | Phenyl Hydroquinone (PhHQ) | 30 | 30 | 20 | 10 | 0 | 10 | 122 | — | Transparent |
| 2 | " | 25 | 35 | 20 | 0 | 0 | 20 | 136 | — | Transparent, strong |
| 3 | Methyl Hydroquinone (MeHQ) | 25 | 35 | 20 | 0 | 0 | 20 | 108 | — | Transparent, strong |
| 4 | " | 30 | 30 | 20 | 10 | 0 | 10 | 107 | 191 | Transparent |
| 5 | " | 30 | 30 | 20 | 0 | 10 | 10 | 108 | — | Transparent, strong |
| 6 | 1,4-Dihydroxynaphtalene (1,4-DHN) | 30 | 30 | 20 | 10 | 0 | 10 | 118 | 349 | Transparent, strong |
| 7 | 1,6-Dihydroxynaphtalene (1,6-DHN) | 30 | 30 | 20 | 10 | 0 | 10 | 111 | 257 | Transparent |
| 8 | 2,7-Dihydroxynaphtalene (2,7-DHN) | 30 | 30 | 20 | 10 | 0 | 10 | 105 | — | Transparent |
| 9 | Vanillic Acid (V) | 25 | 30 | 20 | 10 | 10 | 5 | 109 | — | Transparent, some strength |
| 10 | 4,4-Dihydroxybenzophenone (DHB) | 30 | 30 | 20 | 10 | 5 | 5 | 104 | 263 | Transparent |
| 11 | 3,3'-Diphenyl-4,4'-biphenol (DPBP) | 30 | 30 | 20 | 10 | 0 | 10 | 136 | — | Transparent |
| 12 | 2,6-Dihydroxyanthraquinone (AQ) | 30 | 30 | 20 | 10 | 0 | 10 | 10 | 113 | 319 | Transparent, weak |
| 13 | 1,4-Cyclohexanedimethanol (CHDM) | 30 | 30 | 20 | 0 | 10 | 10 | 100 | 361 | Transparent, smooth |
| 14 | 2,2'-Biphenol (2,2'-BP) | 40 | 30 | 15 | 0 | 0 | 15 | 119 | 203 | Transparent |

EXAMPLES

Example 1. Preparation of the polymer: The following monomers were charged to a 500 ml 3-neck flask equipped with a half-moon shaped TEFLON® stirrer blade, gas inlet tube, thermocouple, and Vigereux column attached to a condenser and receiver: 4-hydroxybenzoic acid (HBA), 0.3 mole, for $P^1$; terephthalic acid (TA), 0.2 mole, for $P^2$, 4,4'-biphenol (BP), 0.1 mole, for $P^3$; 6-hydroxy-2-naphthoic acid (HNA), 0.30 mole, for $P^4$, and phenylhydroquinone (PhHQ), 0.1 mole, for $P^5$. The flask was immersed in an oil bath and purged of oxygen by evacuation followed by flushing with dried nitrogen. Acetic anhydride (1.025 moles) and potassium acetate (0.02 gm) were added. While purging with nitrogen, the contents of the flask were stirred at 2000 rpm and heated to 200° C. over a 60 minute period. The temperature was then increased at a rate of about 1° C. per minute to 320° C. The reaction mixture was maintained at 320° C. for 60 minutes and then the flask was slowly evacuated to a pressure of 1 mbar. The polymer viscosity increased as the remaining acetic acid was removed. After 25 minutes the vacuum was broken with dry nitrogen, and the flask was allowed to cool. The polymer was removed from the flask and analyzed.

The polymer had an inherent viscosity (IV) of 5.7 dl/gm as determined in a 0.1% (by weight) solution in 1:1 pentafluorophenol-hexafluoroisopropanol at 60° C. The polymer had a glass transition temperature (Tg) of 136° C. and no solid-to-nematic transition as determined by differential scanning calorimetry (10° C./min heating rate). The polymer melt was optically anisotropic, and at 290° C., could be extruded (see Example 15) into a transparent film with good strength.

Examples 2–14: Following the procedure outlined in Example 1, additional compositions were prepared using the following monomers in place of, or in addition to, phenylhydroquinone (ps): methylhydroquinone (MeHQ), vanillic Example 15. General Procedure for Polarizer Film Extrusion: Undyed polymers were dried at 100° C. under 30" vacuum for approximately 18 hours. Dyed polymers were dried at the same temperatures, but without the vacuum. The polymer samples were then cold-pressed into cylindrical rods of approximately ½" diameter and 3" length.

For extrusion, the polymer rod was placed in a suitable tube and a metal Follower was inserted behind the rod. A RAM was brought forward (RAM pressure: about 15–100 psi) which forced the polymer rod up against a heated grid (grid temperature: about 225°–350° C.) at a fixed extrusion rate. The melted polymer flowed through a Pack (a filter media of 80/120 shattered metal and a support screen; Pack temperature: about 225°–350° C.; Pack pressure: about 75–100 psi). The melt temperature was about 225°–350° C. The melt then flowed through a film die (0.005" thick and 0.250" wide). The resulting film was then quenched via a circular quench ring which was located directly below the die; the quench flow was 0.250 standard cubic feet per minute. The film was then taken up in a winder at a take-up speed of about 5.0 to 25.0 meters per minute, and the film properties were studied.

What is claimed is:

1. A polarizing film having a polarizing efficiency of at least 70% and comprising a blend of a film-forming, wholly aromatic thermotropic liquid crystal polyester and a dichroic dye, wherein said polyester comprises repeat units corresponding to the formula:

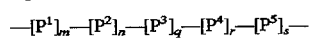

wherein $P^1$, $P^2$, $P^3$, $P^4$ and $P^5$ represent monomeric moieties with $P^1$ being an aromatic hydroxy carboxylic acid or aromatic amino carboxylic acid, $P^2$ being an aromatic dicarboxylic acid, $P^3$ being a phenol, $P^4$ being a second aromatic hydroxy carboxylic acid or aromatic amino carboxylic acid moiety different from $P^1$, and $P^5$ being a second phenolic moiety different from P³; and m, n and q represent mole percent of the respective monomers ranging from 5–70 mole percent individually, and r and s represent mole percent of the respective monomers ranging from 5–20 mole percent individually, with m+n+q+r+s totaling 100 mole percent.

2. The polarizing film of claim 1, wherein P¹ is selected from the group consisting of 4-hydroxybenzoic acid, 4-aminobenzoic acid, 2-hydroxy-6-naphthoic acid, and 4-carboxy-4'-hydroxy-1,1'-biphenyl.

3. The polarizing film of claim 1, wherein P² is selected from the group consisting of terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid.

4. The polarizing film of claim 1, wherein P³ is selected from the group consisting of resorcinol, hydroquinone, methyl hydroquinone, phenyl hydroquinone, catechol, 4,4'-dihydroxybiphenyl and acetaminophen.

5. The polarizing film of claim 1, wherein said P⁴ is selected from the group consisting of 4-hydroxybenzoic acid, 4-aminobenzoic acid, 2-hydroxy-6-naphthoic acid, and 4-carboxy-4'-hydroxy-1,1'-biphenyl.

6. The polarizing film of claim 1, wherein said P⁵ is selected from resorcinol, hydroquinone, catechol, 4,4'-dihydroxybiphenyl, bisphenol-A and acetaminophen.

7. The polarizing film of claim 2, wherein P¹ is 4-hydroxybenzoic acid.

8. The polarizing film of claim 2, wherein P¹ is 2-hydroxy-6-naphthoic acid.

9. The polarizing film of claim 3, wherein P² is terephthalic acid.

10. The polarizing film of claim 4, wherein P³ is 4,4'-dihydroxybiphenyl.

11. The polarizing film of claim 5, wherein said P⁴ is 4-hydroxybenzoic acid.

12. The polarizing film of claim 6, wherein said P⁵ is resorcinol.

13. The polarizing film of claim 1, wherein said dye is selected from the group consisting of straight chain dye, branched dye, direct dye, disperse dye, solvent dye and acidic dye.

14. The polarizing film of claim 1, wherein said dye is selected from the group consisting of azo dyes, anthraquinone dyes, Disperse Red, Blue 214, Red 60 and Yellow 56, Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green and 85, Yellow 8, 12, 44, 86, and 87, Orange 26, 39, 106 and 107, and Methylene violet Bernthsen.

15. The polarizing film of claim 14, wherein said dye is an anthraquinone dye.

16. The polarizing film of claim 1, wherein said blend is prepared by melt blending said polymer and said dye.

17. A polarizing film having a polarizing efficiency of at least 70% and comprising a blend of (a) a film-forming wholly aromatic thermotropic liquid crystal polyester which comprises 4-hydroxybenzoic acid, terephthalic acid, 4,4'-dihydroxybiphenyl, 6-hydroxy-2-naphthoic acid, and phenyl hydroquinone in a molar ratio 30:20:10:30:10 respectively, and (b) a dichroic dye.

18. A process of preparing a polarizer film-forming composition, which process comprises: (a) preparing a suitable film-forming, wholly aromatic thermotropic liquid crystal polyester and (b) blending said liquid crystal polyester with one or more suitable dichroic dyes by a suitable process to form the polarizer film-forming composition, wherein said polyester comprises repeat units corresponding to the formula:

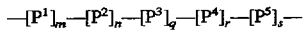

wherein P¹, P², P³, P⁴ and P⁵ represent monomeric moieties with P¹ being an aromatic hydroxy carboxylic acid or aromatic amino carboxylic acid, P² being an aromatic dicarboxylic acid, P³ being a phenol, P⁴ being a second aromatic hydroxy carboxylic acid or aromatic amino carboxylic acid moiety different from P¹, and P⁵ being a second phenolic moiety different from P³; and m, n and q represent mole percent of the respective monomers ranging from 5–70 mole percent individually, and r and s represent mole percent of the respective monomers ranging from 5–20 mole percent individually, with m+n+q+r+s totaling 100 mole percent.

* * * * *